United States Patent [19]

Ciliberti, Jr.

[11] 4,409,051
[45] Oct. 11, 1983

[54] METHOD OF JACKETING A BATTERY WITH A SELF-ADHESIVE BATTERY JACKET AND ARTICLE

[75] Inventor: Frank L. Ciliberti, Jr., Ossining, N.Y.

[73] Assignee: Duracell Inc., Bethel, Conn.

[21] Appl. No.: 89,821

[22] Filed: Oct. 31, 1979

[51] Int. Cl.³ .......................................... B29C 17/02
[52] U.S. Cl. .................................. 156/212; 156/227; 156/344; 429/175; 428/40
[58] Field of Search .............. 429/163, 175, 174, 177; 428/40, 41; 156/212, 214, 227, 344

[56] References Cited

U.S. PATENT DOCUMENTS

| | | | |
|---|---|---|---|
| 1,678,601 | 7/1928 | Meisekothen | 429/163 X |
| 1,737,445 | 11/1929 | Anthony | 429/177 X |
| 3,532,652 | 10/1970 | Zang et al. | 428/40 X |
| 3,690,909 | 9/1972 | Finley | 428/40 |
| 3,859,133 | 1/1975 | Dickfeldt et al. | 429/163 X |
| 3,922,408 | 11/1975 | Smith | 428/40 |

FOREIGN PATENT DOCUMENTS 435235  9/1935  United Kingdom ............... 429/175

*Primary Examiner*—Alexander S. Thomas
*Attorney, Agent, or Firm*—Ronald S. Cornell; Israel Nissenbaum

[57] ABSTRACT

A battery jacket having an adhesive layer between an outer layer and a release layer, with the jacket being of a predetermined shape to substantially conform to the exterior surface of a battery. The jacket desirably has hinge lines to improve its ability to conform to the battery. On removing the release layer, the jacket is applied to the battery by pressing the adhesive layer onto the exterior surface of the battery and conforming the jacket to the exterior surfaces of the battery.

1 Claim, 5 Drawing Figures

METHOD OF JACKETING A BATTERY WITH A SELF-ADHESIVE BATTERY JACKET AND ARTICLE

FIELD OF THE INVENTION

This invention relates to battery jackets, and more particularly to jackets having an adhesive layer and being of predetermined shape to substantially conform to the exterior of a battery.

BACKGROUND OF THE INVENTION

For many applications a battery is wrapped in a jacket prior to sale. The jacket is generally die cut paper or cardboard which, when folded, will conform to the shape of the battery exterior. Hinge lines can also be impressed on the jacket to aid in forming flaps for the final jacket assembly around the battery.

Known methods of attaching jacketing materials to batteries have generally been unsatisfactory. Difficulties have been encountered in achieving a consistantly good fit between the jacket and the exterior of the battery without an excessive number of manufacturing steps.

Heretofore when the jacket was to be applied to the battery it was folded along hinge lines, if present. Glue was then deposited on some of the jacket flaps of the battery, and the jacket was assembled around a portion of the battery. The glue was then allowed to set. Hot melt glue and contact cement are typical of the glues that have been used. It was then necessary to check the fit of the jacket to the battery after the glue set, and spacers or fillers were inserted as necessary to insure a tight fit between the jacket and the battery. The remaining jacket flaps were then glued around the battery. Again, after the glue set, the jacket was tested for proper fit. If the fit was bad the jacket was opened, new fillers added, and the jacket reglued. It was necessary to repeat this process until a good fit was achieved.

Problems were also encountered in the storage and use of the required glues. Many of these are both flammable and toxic, requiring special storage facilities and procedures. Further, many of the solvents used in the glue and gluing procedures are toxic, requiring special protection of workers during their use. Environmental problems were also encountered in the disposal of the solvent vapors, glue residue and waste material.

THE INVENTION

It has now been discovered that the problems involved in the use of glue during battery jacketing and the difficulties of obtaining a good fit between the jacket and the battery exterior, without an excesive number of steps, can be solved by applying an adhesive layer to the battery jacket during jacket manufacture. The adhesive layer can be protected until use by a release layer, which is also preferably applied during jacket manufacture. The battery is jacketed by simply removing the release layer, and conforming the jacket to the exterior surface of the battery. The finished jacket can be a laminate or a coated material comprising an outer layer, an adhesive layer and a release layer.

The battery jacket, after the application of the adhesive and release layers, is precut into the desired shape and can be provided with hinge lines in the same manner as conventional battery jackets. The new jacket not only adheres to itself but also to the battery. The direct adherence of the jacket to the battery eliminates the need for fillers and spacers, since there is no clearance between the battery and jacket.

Previous storage, environmental, worker health and safety problems associated with battery jacketing are eliminated. There now are no hot, toxic or flammable fumes, solvents and vapors to store, manage and dispose. The time previously expended in applying the glue, waiting for it to set, checking the jacket fit, final gluing, jacket fit adjustments and readjustments are all eliminated. Instead, a simple two step procedure is employed, wherein after removal of the release layer, the jacket is easily conformed to the exterior of the battery.

These and various other features and advantages of the invention will be more fully apparent from the following disclosure, drawings and example.

DETAILED DESCRIPTION OF THE DRAWINGS

Figure 1:
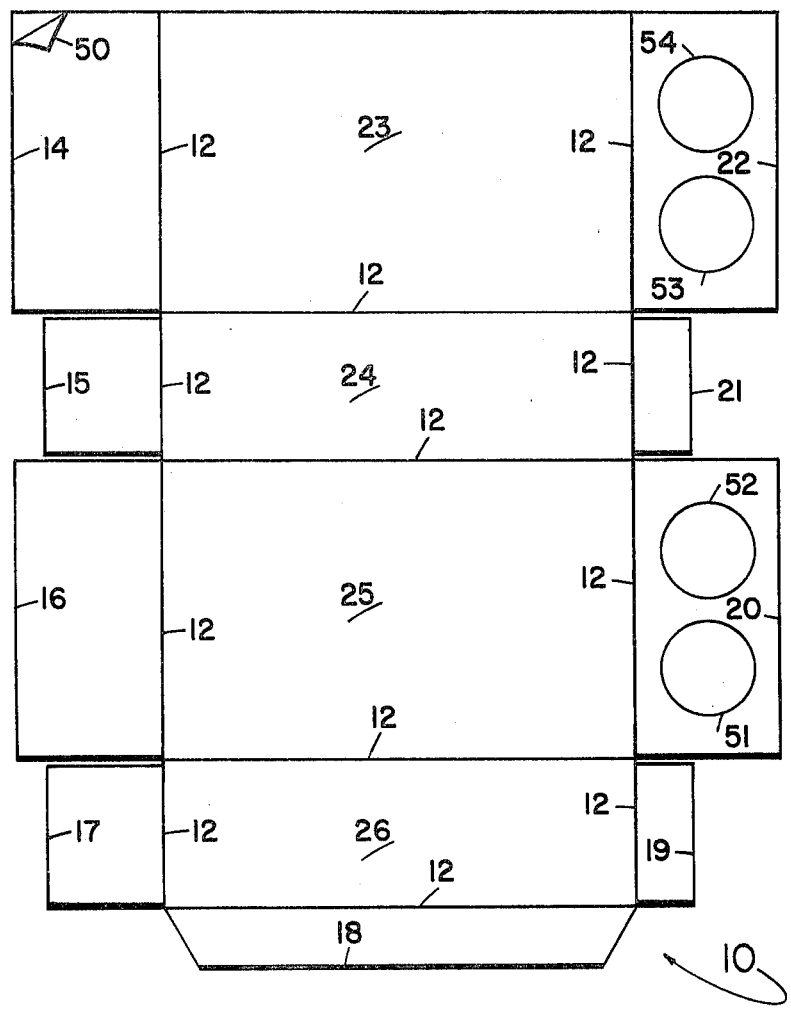
FIG. 1 is a top plan view of a battery jacket made in accordance with the invention.

A battery jacket 10 made in accordance with the present invention is shown in FIG. 1. The jacket 10 is shown as having been precut in a conventional manner, as by diecutting, into a predetermined shape to substantially conform to the exterior surface of a particular battery. Hinge lines 12, which have been formed in a conventional manner well known in the art, are so situated on the precut jacket 10 as to form tabs 14 to 22 and panels 23 to 26. The combination of hinge lines 12 and tabs 14 to 22, permit the jacket 10 to be easily conformed to the exterior of the battery.

Figure 2:
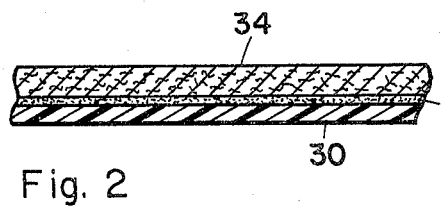
FIG. 2 is an enlarged cross sectional view of a preferred composite material which is useful as the battery jacket.

In FIG. 2 a preferred material for use as a battery jacket is shown. It is comprised of a release layer 30, an adhesive layer 32 and an outer layer 34. The release layer 30 is of a conventional type and is desirably relatively flexible, when used with a generally more rigid outer layer 34, so that it can be peeled away, exposing the adhesive layer 32. Alternatively, the outer layer 34 can be flexible permitting it to be peeled away from the release layer 32 without difficulty. A preferred material for the release layer 30 is a silicone, polyethylene or acrylic coated paper. Other preferred materials include silicone coated polyethylene, polypropylene and polyester films. An important requirement of the release layer 30 is that it adhere to and protect the adhesive layer 32 before use, but be capable of being easily removed without damaging the adhesive layer 32 or outer layer 34 when the jacket 10 is to be applied to the battery. Such release layers are well known in the art, being used to protect the adhesive of items such as labels and the like.

The adhesive layer 32 is preferably comprised of a pressure sensitive adhesive.

The adhesive used should adhere well to the outer layer 34 and to the exterior of the battery. Since the battery surface is usually a metal, adhesives capable of adhering to metal are preferred. Further, since electrolyte can leak from the battery, the adhesive should be able to retain its adhesive properties in the presence of the electrolyte. Such electrolytes generally include aqueous, acidic or basic salt solutions.

The various adhesives useful with the present invention are all well known in the art. Examples of and formulations for useful pressure sensitive adhesives can be found in many standard reference books such as "Handbook of Adhesives" edited by Irving Skeist (New York: Reinhold Publishing Corporation, 1962) and John Delmonte, "The Technology of Adhesives" (New York: Reinhold Publishing Corporation 1947).

Preferred pressure sensitive adhesives include those made with various forms of rubber such as butyl rubbers, natural rubbers, neoprene rubbers, reclaimed rubbers and styrene-butadiene rubbers. Other preferred adhesives include various acrylic copolymers, polyvinyl acetals, polystyrenetriaryl phosphate mixtures, and silicones.

Pressure sensitive adhesives based on the various forms of rubber, have been widely used. Such adhesives generally employ the desired type of rubber with added materials such as tackifying agents, solvents, fillers and antioxidants. Examples of such added tackifying agents include rosin, various gums, and various resins, such as coumarone-indene.

Solvents useful with rubber based adhesives include many well known alkanes, aromatics and water. Useful fillers include many metal oxides such as zinc oxide. Useful antioxidants include, among others, metal chelating agents.

Acrylic copolymers are becoming more important as pressure sensitive adhesives, due to their use of water as a solvent. Water solvents cause fewer environmental problems than the organic solvents employed with other adhesives. The various useful acrylic copolymers are well known in the art and include copolymers of vinyl acetate or acrylates which contain carboxyl groups.

Another important class of pressure sensitive adhesives is silicones. Raw, unvulcanized silicone rubbers can be vulcanized with a peroxide to give a useful pressure sensitive adhesive. Siloxane agents such as diphenylsiloxane, dimethylsiloxane and monomethylsiloxane can also be employed to give useful adhesives. Organosilicone resins will similarly form useful pressure sensitive adhesives. These and other silicone pressure sensitive adhesives are well known in the art.

Other examples of useful pressure sensitive adhesives include mixtures of polystyrene and various triaryl phosphates. Polyvinyl ethers, polyacrylate esters, cellulose nitrate and various polyvinyl resins such as polyvinyl acetates, polyvinyl chloride and polyvinyl acetals can also be employed, in well known combinations, to produce acceptable pressure sensitive adhesives.

The adhesive layer 32 can be applied to the outer layer 34 in any conventional manner, many of which are well known in the art. Similarly, the release layer 30 is applied to the adhesive layer 32 using methods well known in the art.

The outer layer 34 can provide a surface for the printing of a label, with the label containing trademarks, instructions and other necessary or desirable markings. The outer layer 34 can be any somewhat flexible material desired by the jacket user. Preferred materials include absorbent and electrolyte impervious materials.

Absorbent materials can include cellulose type materials such as cardboard, fire retardant kraft paper, or other structurally adequate forms of paper. Alternatively, the absorbent material can be various porous plastics, polymers or combinations of absorbent materials and binding materials. Of course, any materials used should be sufficiently flexible to conform to the battery and be able to fold along the hinge lines 12.

An absorbent type outer layer 34, as shown in FIG. 2, can absorb most if not all of any electrolyte that may possibly leak from the battery. Further, an absorbent material is usually resilient and will help cushion and to some degree protect the battery during shipping and use.

Figure 3:
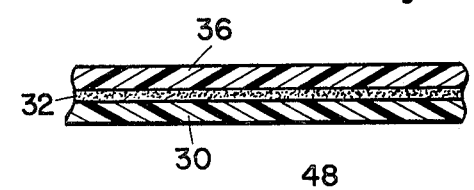
FIG. 3 is an enlarged cross sectional view of another desirable material useful as the battery jacket.

A battery jacket having an electrolyte impervious type outer layer 36, is shown in FIG. 3. The outer layer 36 can be made of any of the plastics that are somewhat flexible, and are relatively impervious and inert to the electrolyte. Such materials are well known in the packaging art. They include but are not limited to acrylics, fluoroplastics, nylon, polyester, polyethylene, polyamide, polypropylene, polystyrene, and polyvinyl chloride. Other materials well known in the art having different desired properties, i.e. degree of flexibility, shock resistance, etc., can also be used for the outer layer 36 depending on the requirements of the jacket user. As in FIG. 2, an adhesive 32 and a release layer 30 are shown in combination with the electrolyte impervious type outer layer 36.

Figure 4:
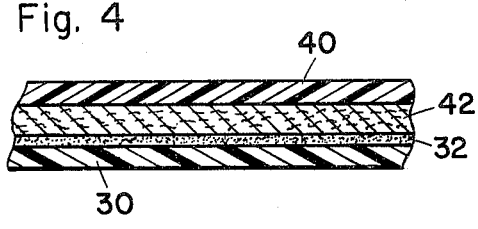
FIG. 4 is an enlarged cross sectional view of yet another desirable embodiment of a material for the battery jacket.

The jacket can alternatively be a four layer laminate or coated article as shown in FIG. 4. In FIG. 4 the jacket is shown as being comprised of an electrolyte impervious layer 40, and an absorbent layer 42. The layers 40 and 42 are shown bonded together in a conventional manner, such as by heat, pressure or adhesive. The adhesive layer 32 and release layer 30, respectively, are conventionally formed on the absorbent layer 42.

The absorbent layer 42 acts to absorb any electrolyte that may leak from the battery and to help cushion any shocks applied to the battery. The electrolyte impervious layer 40 prevents contact between the electrolyte wetted absorbent layer 42 and the environment. The impervious layer 40 protects anyone handling the battery and the equipment in which the battery is installed from being damaged by any leaked electrolyte.

In FIG. 4 the absorbent layer 42 is shown between the adhesive layer 32 and electrolyte impervious layer 40. Alternatively, in an embodiment not depicted, the electrolyte impervious layer 40 can be positioned between the adhesive layer 32 and absorbent layer 42. In this embodiment the impervious layer 40 would prevent electrolyte from reaching the absorbent layer 42. The absorbent layer 42 would cushion the battery and absorb any electrolyte that was able to pass though pinholes in or around the edges of the impervious layer.

Figure 5:
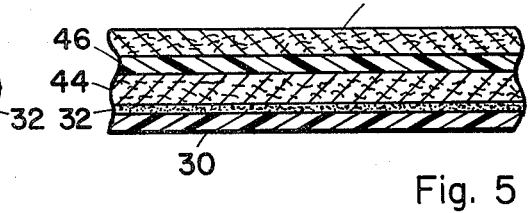
FIG. 5 is an enlarged cross sectional view of another highly useful battery jacket material.

The jacket shown in FIG. 5 utilizes a three component outer layer. The first layer 44 is comprised of a first absorbent type material, such as carboard. A release layer 30 protected pressure sensitive adhesive 32 is coated on one side of the first layer 44. The second layer is an electrolyte impervious material which can be any one of the previously disclosed electrolyte impervious materials. The third layer 48 is another layer of absorbent material.

The three component outer layer absorbs any electrolyte leaking into the first layer 44. The second layer 46 prevents any excess electrolyte from being absorbed by the third layer 48. This permits the third layer 48 to retain its physical appearance and prevents any markings on the surface of the third layer 48 from being obliterated or discolored. The laminate 43 itself can be made in a conventional manner, well known in the art.

The description of the above laminates 38 and 43 is for illustrative purposes. Various other laminates well known in the art (not shown) can also be used in the battery jacket of the present invention. These other possible laminates would be designed for specific functions or to achieve specific results. Such other laminates can include several layers of absorbent materials, possibly using different types of materials, or multiple layers of absorbent materials and electrolyte impervious materials to further reduce the possibility of electrolyte leaking through the jacket. Such other laminates are included within the broadest scope of the present invention.

In the use of the battery jacket 10 of the present invention, it is contemplated that the battery (comprising at least one cell) will be jacketed by first removing the release layer 30. This is preferably accomplished by using a pull tab 50 which can be formed from, or added to the release layer 30. The tab 50, as shown in FIG. 1, can be formed by folding a corner of the release layer 30. The pull tab 50 permits the jacket user to readily grasp the release layer 30 and remove it from the jacket 10. Increasing the ease of grasping and removing the release layer 30 increases the speed at which the jacket 10 can be applied. This in turn reduces the cost of applying the jacket 10.

Removing the release layer 30 exposes the adhesive layer 32, which in the preferred embodiment is a pressure sensitive adhesive. The portions of the jacket panels 23-26 having the preferred pressure sensitive adhesive layer 32 can then be pressed against the exterior surfaces of the battery until they are conformed to the battery.

Jacketing is continued by pressing tab 18 of the jacket 10 onto the exposed surface of the first panel 23. Tabs 14, 15, 16 and 17 are pressed against the bottom of the battery, enclosing the bottom of the battery. Tabs 19 and 21 are pressed onto the top of the battery with tabs 20 and 22 pressed over them. In the jacket 10 shown, tabs 20 and 22 have circular openings 50, 51, and 52, 53 respectively, which permit the terminals (not shown) of the battery to pass through the tabs 20 and 22.

For batteries other than the rectangular one for which the embodiment shown in FIG. 1 is designed, the sequence of folding the battery jacket will vary. The method of applying the battery jacket of the present invention need not vary. The release layer 30 is first removed to expose the adhesive layer 32, which is preferably comprised of a pressure sensitive adhesive. The adhesive layer 32 is then pressed onto the exterior surfaces of the battery as the battery jacket is conformed to the exterior surfaces of the battery. The self-adhesive nature of the jacket of the invention also acts to hold each portion of the jacket in place while the subsequent steps are performed.

Hinge lines 12 which are shown in FIG. 1 are not required, but do aid in the conforming of the jacket 10 to the battery. The hinge lines 12 are placed on the jacket 10 so that when the jacket 10 is folded along the hinge lines 12, the jacket 10 is able to closely follow the edges of the battery. The whole jacket 10 can then substantially conform to the battery exterior.

EXAMPLE 1

The battery jacket of FIG. 1 is manufactured, using the composite material shown in FIG. 2, by forming a $1 \times 10^{-2}$ millimeter thick layer of a pressure sensitive adhesive on a 6 millimeter thick section of cardboard. The adhesive is a pressure sensitive adhesive comprised of 50 parts styrenebutadiene rubber, 50 parts milled smoked rubber sheet, 50 parts ester of hydrogenated rosin, 2 parts polymerized trimethyl dihydroquinoline and 20 parts petroleum oil.

The adhesive is protected by a $9 \times 10^{-2}$ millimeter thick release layer made of polyethylene coated paper. After forming the various layers the jacket is die cut to form the desired shape as shown in FIG. 1.

EXAMPLE 2

The battery jacket of FIG. 1 is manufactured, using the composite material shown in FIG. 2, by forming a $1 \times 10^{-2}$ millimeter thick layer of a pressure sensitive adhesive on a 4 millimeter thick section of fire retardant kraft paper. The adhesive used is a rubber based pressure sensitive adhesive sold under part number S-6261 by Adhesive Research Inc., Glenrock, Pa.

The adhesive is protected by a $9 \times 10^{-2}$ millimeter thick release layer made of polyethylene coated paper. After formng the various layers the jacket is die cut to form the desired shape, as shown in FIG. 1.

The preceeding drawings and example are for illustrative purposes only. It is understood that the battery jacket of the present invention can have dimensions and configurations other than those shown. Further, other changes and variations can be made without departing from the spirit and scope of the present invention as defined in the following claims.

What is claimed is:

1. A method of jacketing a battery, said battery having exterior surfaces and comprising at least one cell, with a jacket, said jacket initially comprising an outer layer, a release layer, and an electrolyte resistant pressure sensitive adhesive layer positioned between said outer layer and said release layer, and said outer layer of said jacket being a laminate comprised of two absorbent layers with an electrolyte impervious layer positioned therebetween and having hinge lines, said jacket being of predetermined shape to substantially conform to the exterior surfaces of said battery to be jacketed; said method consisting essentially of the steps of removing said release layer, pressing a portion of said jacket to an exterior surface of said battery, folding said jacket along a hinge line to bring another portion of said jacket into alignment with another portion of said battery and pressing it into adhering contact therewith, and repeating the last said steps until said jacket is substantially conformed and adhered to said battery.

* * * * *